Jan. 6, 1925.
R. R. REYNOLDS
1,522,080
LIQUID LEVEL TANK GAUGE
Filed Aug. 5, 1922
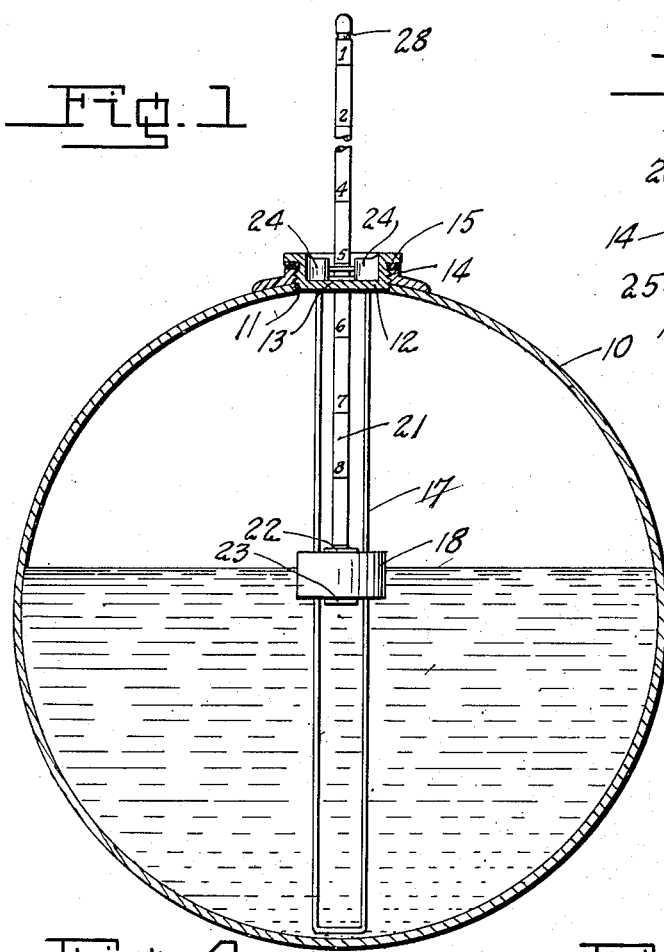
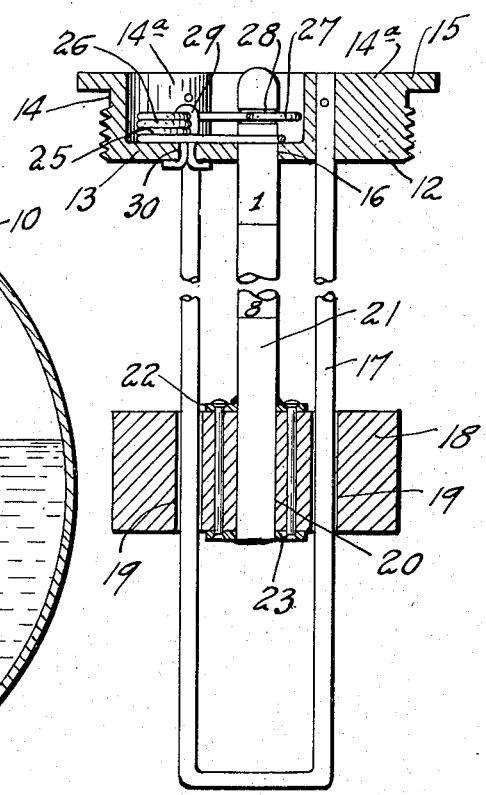
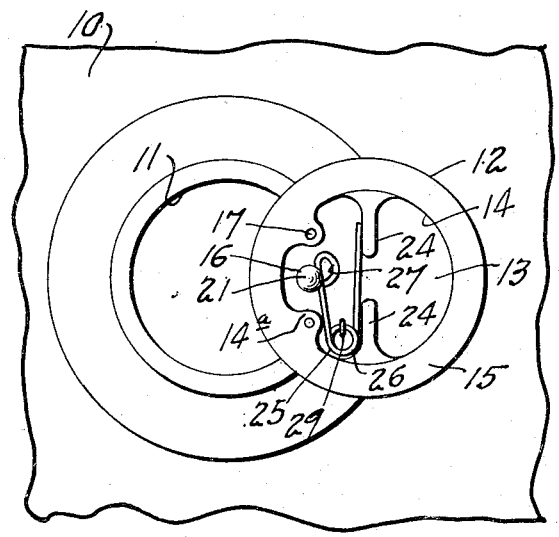
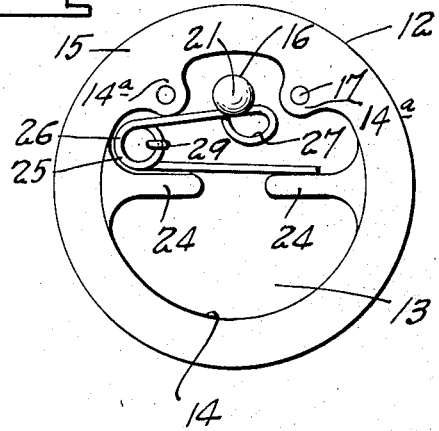
Inventor
R. R. Reynolds
By Watson E. Coleman
Attorney Patented Jan. 6, 1925.

1,522,080

UNITED STATES PATENT OFFICE.

ROHDE R. REYNOLDS, OF HOUSTON, TEXAS.

LIQUID-LEVEL TANK GAUGE.

Application filed August 5, 1922. Serial No. 579,886.

*To all whom it may concern:*

Be it known that I, ROHDE R. REYNOLDS, a citizen of the United States, residing at Houston, in the county of Harris and State of Texas, have invented certain new and useful Improvements in Liquid-Level Tank Gauges, of which the following is a specification, reference being had to the accompanying drawings.

This invention relates to improvements in tank gauges, and more particularly to a device of this character adapted for use in connection with the gasoline tanks of motor vehicles.

An important object of the invention is to provide a device of this character carried by and operating from the filler cap of the tank, thereby permitting its use with and installation in tanks now in use.

A further object of the invention is to provide a device of this character which while engaged with the tank cap need not be removed from the tank to permit filling thereof. In the majority of the tank gauges of this character with which I am familiar the construction of the gauge is such that the gauge coacting with the cap prevents the insertion of the filling hose in the tank opening and accordingly the cap and gauge must be bodily removed from the tank. In others, the filling of the tank is possible by completely removing the cap from the gauge and tank. Either of these constructions is inefficient, the first, in that considerable loss of time is involved in removing the gauge and seeing that the same is properly returned to position; the second, in that the cap is often lost or the replacement thereof neglected.

A still further object of the invention is to provide a device of this character which is very simple and stable in its construction, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a vertical sectional view taken through a tank embodying a tank gauge constructed in accordance with my invention;

Figure 2 is an enlarged vertical sectional view taken through the tank gauge and filler cap;

Figure 3 is a plan view of the filler cap and gauge removed; and

Figure 4 is a plan view showing the filler cap turned to one side to permit filling of the tank.

Referring now more particularly to the drawings, the numeral 10 indicates a gasoline tank of any desired construction, 11 the filling opening thereof, and 12 the filler cap. These caps are usually in the form of a plate 13 provided at its edge with an upstanding flange 14 which is externally screw-threaded for engagement in the threaded filling opening 11 of the tank, the upper edge of the flange being provided with an outstanding shoulder 15 completing the closure of the tank. By this means a trap is formed for the collection of gasoline splashing from the breather opening usually provided in these caps so that this may be returned to the tank.

In accordance with my invention I provide in the plate 13 adjacent the flange 14 an opening 16, the usual breather opening being omitted. The flange 14 adjacent the sides of the opening is relatively thickened, as indicated at 14ª, and has openings formed therein receiving the ends of a U-shaped guide wire 17, the ends of the wire being secured in the openings in any desired manner. The numeral 18 designates a float having openings 19 through which the arms of the guide member 17 extend. This float is provided with a central opening 20 aligning with the opening 16 of the cap, and in the opening 20 is seated the lower end of a gauge rod 21.

This gauge rod may be of any suitable construction but is preferably formed of some light material marked exteriorly thereof to indicate gallons of tank capacity, and which may likewise be numerically indicated upon the rod if so desired. The gauge rod is secured to the float 18 by means of plates 22 and 23 secured upon the upper and lower faces of the float respectively, and through which the rod extends, these plates being suitably secured to one another and to the float. The upper end of the gauge rod 21 extends through the opening 16 of the cap and will indicate by the height of its projection the amount of liquid fuel within the tank.

It will be noted that by the construction hereinbefore set forth, the connection of the gauge and the guides therefor is such that the entire gauge is eccentrically disposed with relation to the cap and at the same time is so disposed that it will not interfere with the rotation of the cap to free the same from the filler opening of the tank. The cap may accordingly be rotated, finger holds 24 for this purpose being provided, and when freed may be swung to one side of the opening, as indicated in Figure 4. In this position, the gauge wires and rod lying against the sides of the filler opening permit the cap to be moved so that the filler opening is practically entirely exposed so that a nozzle may be readily inserted in the tank for filling the same. At the same time the cap is retained in its position and cannot be lost.

Since these tanks in many instances are disposed beneath the seats of the automobiles upon which they are employed, it is desirable that means be provided for holding the gauge rod in lowered position except when it is desired to note the contents of the tank. I accordingly provide a spring 25 comprising a single length of wire coiled intermediate its ends, as indicated at 26, to form a spring loop and having one end thereof bearing against the finger holds 24 and the opposite end thereof forced outwardly by the spring loop against the rod 21. This end of the spring wire 25 is provided with a finger loop 27 by means of which it may be engaged to withdraw the same from the rod so that the rod may be elevated by the float which, when the rod is held in lowered position by the spring, will be submerged. When it is desired to secure the rod in lowered position, it is simply necessary to force the same downwardly with the hand. The spring being in engagement therewith at all times, it is accordingly necessary to employ but one hand in manipulating the gauge rod to shift the same either to open or lowered position, since the slight pressure of a finger will release the rod for upward movement. If desired, the rod may be provided adjacent its upper end at that point which will be aligned with the spring 25 when the rod is in the lowered position, with a groove 28 in which the spring may rest. The spring 25 may be held in position by means of a cotter pin 29 receiving the loop 26 of the spring 25 and extending through an opening 30 formed in the cap beneath which the legs of the cotter pin will be spread.

It will be seen that a gasoline gauge constructed in accordance with my invention will be very simple not only in its construction but in its operation and will accordingly be very durable and at the same time provides a construction by means of which complete removal of the cap or of the cap and gauge is unnecessary in order to fill the tank. It will furthermore be obvious that the construction as hereinbefore set forth is capable of some change and modification without materially departing from the spirit of my invention and I accordingly do not limit myself to such specific structure except as hereinafter claimed.

I claim:—

1. In a tank gauge, a cap for closing the filling opening of the tank, guides carried by the cap, a float carried by the guides, and a gauge rod secured to and operated by the float and extending through an opening formed in the cap, said gauge rod opening and said guides being disposed eccentrically of the cap whereby said cap may be removed from the opening and disposed at one side thereof to permit filling of the tank without withdrawing said guides and float from the tank.

2. A cap, adapted to serve as a removable closure for the filling opening of a fuel tank, provided on its inner side with a gauging member located adjacent the outer edge of the cap and adapted to extend into the tank whereby during filling of the tank the cap may be laid on the top of the tank adjacent the filling opening with the projecting member against the edge of the filling opening and extending into the tank thus leaving the filling opening substantially unobstructed, said gauging member comprising a rod provided at its lower end with a float.

3. In a tank gauge, a cap for closing the filling opening of the tank and having an upstanding peripheral flange, said cap having an opening formed therein adjacent said flange, guide rods secured to said cap adjacent said opening and extending into the tank, a float operating upon the guide rods, a gauge rod carried by the float and operating through said opening, and a spring carried by said cap and adapted to normally press against the side face of said gauge rod, said spring being provided with a finger piece permitting withdrawal of pressure from said rod.

4. In a tank gauge, a cap for closing the filling opening of the tank, said cap comprising a circular plate provided at its periphery with an upstanding flange and having an opening formed therein adjacent said flange, said flange having relatively thickened portions on opposite sides of said opening respectively, each portion being provided with an opening, a U-shaped guide member having the ends of its arms secured in the openings of the thickened portions of said flange respectively, a float slidably mounted upon said arms, and a gauge rod secured to the float and extending through the first named opening of the cap.

5. In a tank gauge, a cap for closing the filling opening of the tank, said cap comprising a circular plate provided at its periphery with an upstanding flange, diametrically opposed upstanding finger-holds extending upwardly from the cap within the flange, the plate having an opening formed therein midway between the junctions of the finger-holds with the flange and adjacent the flange, said flange adjacent said opening and on opposite sides thereof having relatively thickened portions provided with openings respectively, a U-shaped guide member having the ends of its arms secured in the openings of the thickened portions of said flange respectively, a float slidably mounted upon said arms, a gauge rod secured to the float and extending through the opening of the plate, a spring carried by said cap at the side of the finger-holds toward the opening and having a portion adapted to engage against the side face of the rod to hold the same in inoperative position, and a second portion bearing against said finger-holds.

In testimony whereof I hereunto affix my signature.

ROHDE R. REYNOLDS.